Patented Dec. 27, 1927.

1,654,288

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

3'-AMINO-4'-HYDROXY-ORTHO-BENZOYL BENZOIC ACID AND PROCESS OF MAKING THE SAME.

No Drawing.   Application filed June 28, 1926.   Serial No. 119,249.

This invention relates to 3'-amino-4'-hydroxy-ortho-benzoyl benzoic acid and a process of making the same.

We have discovered that 3'-amino-4'-hydroxy-ortho-benzoyl benzoic acid can be prepared by the reduction of the corresponding nitro-hydroxy body. The general reaction may be expressed by the following chemical equation:

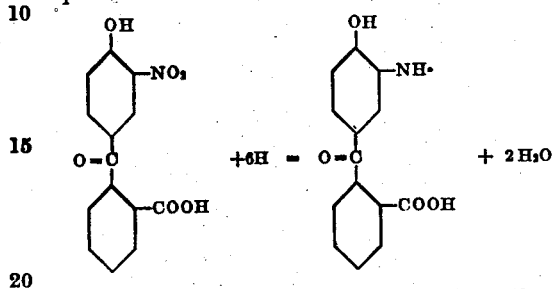

The method of reduction used is similar to the general method of reducing nitro bodies with iron and dilute acids. However, we do not wish to limit our method to any specific reduction process, since these nitro bodies can be reduced by other methods, such as electrolytically, by hydrogen and a catalyst, by tin and hydrochloric acid, and the like.

3'-amino-4'-hydroxy-ortho-benzoyl benzoic acid is a pale yellow powder which apparently has no definite melting point, for upon heating it up in a capillary tube, it begins to decolorize at 260° C. and decompose. When heated to 350° to 400° C., it decomposes to a black residue. The compound is practically insoluble in ordinary organic solvents and glacial acetic acid, but it is easily soluble in dilute caustic soda solution, giving a yellow colored solution. It is soluble in an excess of dilute mineral acid. The sulfate is sparingly soluble in cold water and quite soluble in hot, which fact furnishes a method of recrystallization and purification.

Without limiting our invention to any particular procedure, the following example, in which parts by weight are given, illustrates the application of our invention in the preferred form:

To 300 parts of water are added 400 parts of iron dust and 37 parts of glacial acetic acid or an equivalent amount of dilute acetic acid. This mixture is then heated to 90 to 95° C. and a paste, prepared from 287 parts of 3'-nitro-4'-hydroxy-ortho-benzoyl benzoic acid and 1200 parts of water, is added over a period of 2 to 3 hours. The reaction mass is held at 90–95° C. for 2 hours longer, at the end of which time the reduction is considered completed. A solution of 100 parts of soda ash in 500 parts of water is added to the reduction mass. The iron precipitate is then filtered off at 95 to 100° C. and the cake washed with 500 c. c. water. The filtrate, including the wash water, is slowly run into a mix consisting of 250 parts of hydrochloric acid 20° Bé. and 1000 parts of ice. The acidity of the resulting precipitated mass is adjusted to a weak acidity toward methyl red paper by the addition of either acid or caustic soda. The precipitated 3'-amino-4'-hydroxy-ortho-benzoyl-benzoic acid is now filtered off and dried at 100° C., a yield of 231 parts being obtained.

We are aware that numerous details of the process may be varied without departing from the spirit of this invention, and we do not desire limiting the patent granted other than as necessitated by the prior art.

We claim as our invention:

As a new article of manufacture 3'-amino-4'-hydroxy-ortho-benzoyl benzoic acid, having most probably the following formula:

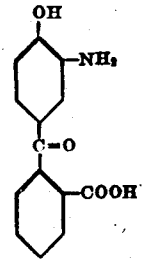

In testimony whereof, we have hereunto subscribed our names.

IVAN GUBELMANN.
HENRY J. WEILAND.
OTTO STALLMANN.